United States Patent [19]

Ocvirk et al.

[11] Patent Number: 4,856,852
[45] Date of Patent: Aug. 15, 1989

[54] BRAKE SYSTEM WITH SLIP CONTROL

[75] Inventors: Norbert Ocvirk, Offenbach am Main; Lutz Weise, Mainz, both of Fed. Rep. of Germany

[73] Assignee: Alfred Teves GmbH, Frankfurt am Main, Fed. Rep. of Germany

[21] Appl. No.: 57,762

[22] Filed: Jun. 3, 1987

[30] Foreign Application Priority Data

Jun. 7, 1986 [DE] Fed. Rep. of Germany ....... 3619207

[51] Int. Cl.$^4$ ........................... B60T 8/26; B60T 8/32; B60T 8/44
[52] U.S. Cl. ..................... 303/114; 303/110; 303/116; 303/119; 303/6.01
[58] Field of Search ...................... 303/6.01, 119, 6 R, 303/114, 116, 117, 113, 110, 61-63, 68-69, 10-13, 92, 100, 111; 188/181, 345; 60/545

[56] References Cited

U.S. PATENT DOCUMENTS

| 4,340,257 | 7/1982 | Belart | 303/119 X |
|---|---|---|---|
| 4,416,491 | 11/1983 | Belart et al. | 303/114 X |
| 4,557,528 | 12/1985 | Leiber | 303/92 |
| 4,578,951 | 4/1986 | Belart et al. | 303/119 X |
| 4,600,243 | 7/1986 | Belart et al. | 303/92 |
| 4,641,895 | 2/1987 | Belart et al. | 303/119 |
| 4,643,487 | 2/1987 | Neubrand | 303/119 X |
| 4,643,492 | 2/1987 | Belart et al. | 303/119 |
| 4,653,813 | 3/1987 | Burgdorf | 303/92 X |
| 4,657,312 | 4/1987 | Burgdorf et al. | 303/92 |
| 4,659,152 | 4/1987 | Reihartz et al. | 303/119 X |
| 4,660,898 | 4/1987 | Steffes | 303/114 |
| 4,685,747 | 8/1987 | Belart et al. | 303/114 |
| 4,702,531 | 10/1987 | Kircher et al. | 303/119 X |
| 4,703,978 | 11/1987 | Belart et al. | 303/116 X |
| 4,708,404 | 11/1987 | Seibert et al. | 303/119 X |
| 4,708,405 | 11/1987 | Belart et al. | 303/119 X |
| 4,715,667 | 12/1987 | Otsuki et al. | 303/116 X |
| 4,729,611 | 3/1988 | Kircher et al. | 303/114 X |
| 4,730,877 | 3/1988 | Seibert et al. | 303/114 X |
| 4,743,075 | 5/1988 | Belart et al. | 303/119 X |
| 4,750,788 | 6/1988 | Seibert | 303/116 X |

FOREIGN PATENT DOCUMENTS

| 3407539 | 9/1985 | Fed. Rep. of Germany . |
|---|---|---|
| 3502018 | 7/1986 | Fed. Rep. of Germany . |
| 3502451 | 7/1986 | Fed. Rep. of Germany . |
| 3504562 | 8/1986 | Fed. Rep. of Germany ...... 303/116 |
| 3542419 | 10/1986 | Fed. Rep. of Germany . |
| 1465613 | 2/1977 | United Kingdom . |
| 2121897 | 1/1984 | United Kingdom . |
| 2155131 | 9/1985 | United Kingdom . |
| 2170286 | 7/1986 | United Kingdom . |

Primary Examiner—Douglas C. Butler
Attorney, Agent, or Firm—James B. Raden

[57] ABSTRACT

In a brake system with slip control comprising a pedal-actuated vacuum booster and a dual-circuit master cylinder, to which the wheel brakes are connected via brake lines, comprises an auxiliary-pressure source with a hydraulic pump and a pressure-compensating and pressure-fluid supply reservoir wheel sensors and electronic circuits for determining the wheel rotational behavior and for generating electric braking-pressure control signals which serve to control electromagnetically actuatable pressure-fluid inlet valves and outlet valves inserted into the brake lines and into the supply line for slip control, a valve is provided in order to control the auxiliary pressure and to adapt same to the pressure in the pressure chambers of the master cylinder. The wheel brakes of the rear wheels are jointly connected via the supply valve to the supply line which forms the third brake circuit and which is acted upon by controlled pressure, while the wheel brakes of the front wheels are connected to the two static brake circuits in which the non-return valves are inserted.

5 Claims, 2 Drawing Sheets

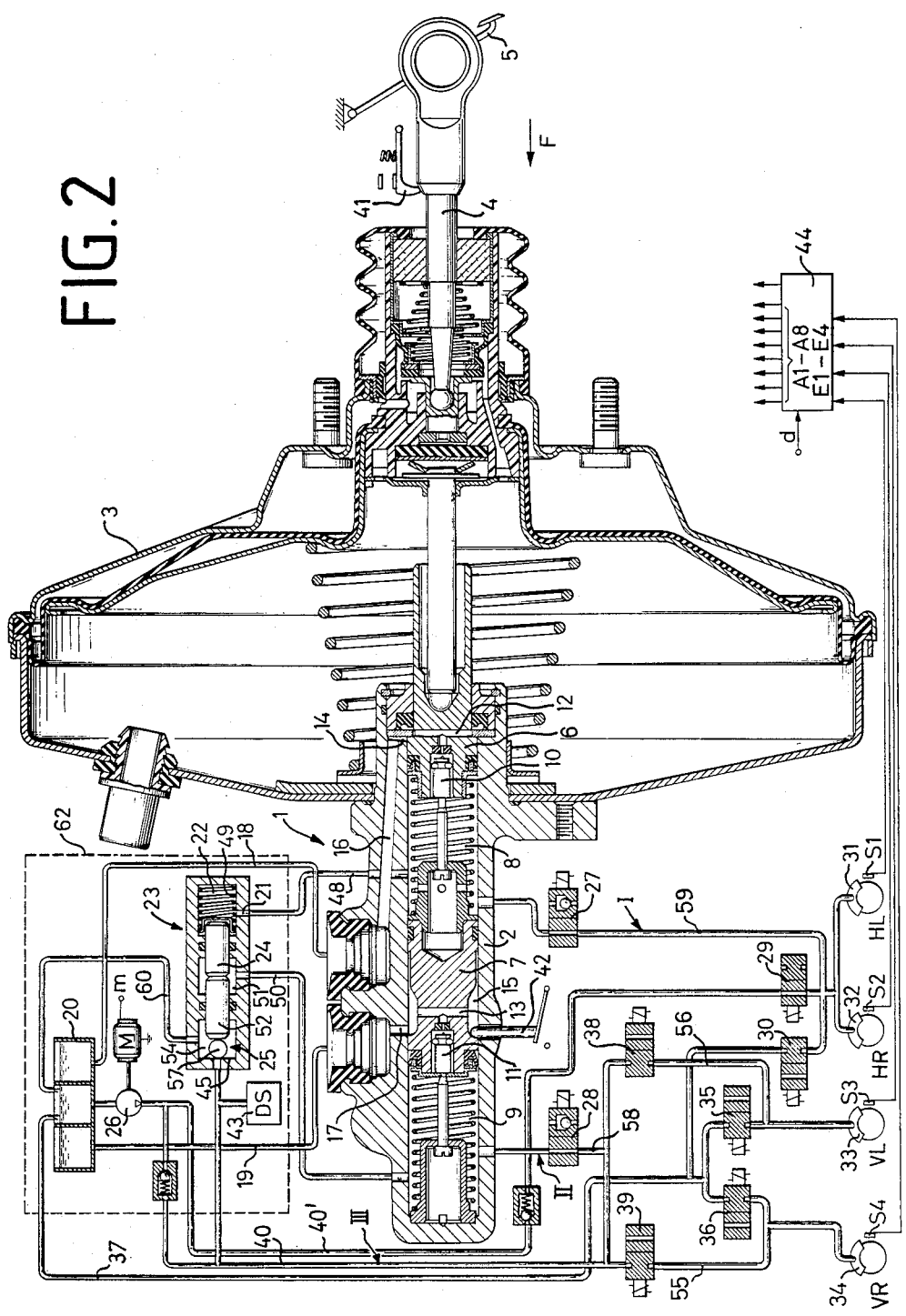

BRAKE SYSTEM WITH SLIP CONTROL

BACKGROUND OF THE INVENTION

The present invention relates to a brake system with slip control and, more particularly, to such a system comprising a pedal-actuated booster with a master cylinder to which the wheel brakes are connected via pressure-fluid lines. Such a system also includes an auxiliary-pressure source with a hydraulic pump and also with a pressure-compensating and pressure-fluid supply reservoir. It further includes wheel sensors and electronic circuits for determining the wheel rotational behavior and for generating electric braking-pressure control signals which serve to control electromagnetically controllable pressure-fluid inlet valves and outlet valves inserted into the pressure fluid lines for the purpose of slip control. It still further includes a regulating and pressure-monitoring valve which communicates with the auxiliary-pressure source, which is connected to at least one pressure chamber of the master cylinder and whose valve chamber communicates with the pressure-fluid supply reservoir and with the supply line leading to the inlet valves.

In a dual-circuit brake system of the type disclosed in W. German application No. P 35 02 451.8, filed Jan. 25, 1985, (corresponding to U.S. application Ser. No. 822,750, filed Jan. 27, 1986 by J. Belart et al now U.S. Pat. No. 4,685,747), there is provided a regulating valve which controls the pressure in the pressure fluid conduit leading from the pump to the two brake lines in dependence on the pressure in a working chamber of the master cylinder, with non-return valves being inserted into the pressure fluid conduit between the brake lines and the pump. Besides, this brake system provides a differential-pressure switch in the electronic circuit to recognize the presence of a differential pressure and to evaluate same. This differential-pressure switch is via special pressure lines communicating both with the pressure fluid conduit which leads from the pump to the brake lines and with a working chamber of the master cylinder.

SUMMARY OF THE INVENTION

It is an object of the present invention to devise a particularly low-priced brake system of the type referred to above, which is operative to apply the wheel brakes of the rear axle with dynamic pressure and the wheel brakes of the front wheels with static pressure. Moreover, the system in accordance with this invention permits a diagonal allotment of the brake circuits. Finally, it permits the use of a pneumatic brake power booster.

This will be achieved by the present invention in that the wheel brakes of the rear wheels of the vehicle are jointly connected with the supply line by the intermediary of a supply valve, and the wheel brake of the one front wheel communicates directly with the first pressure chamber of the dual-circuit master cylinder, and the wheel brake of the other front wheel is connected either directly to the second pressure chamber or also to the first pressure chamber.

In an alternative embodiment, the wheel brakes of the rear wheels are jointly connected via a brake line to the one pressure chamber of the dual-circuit master cylinder, on the one hand, and are connected with the supply line of the auxiliary-pressure source via a supply valve, on the other hand. The wheel brakes of the two front wheels are jointly connected via brake lines to the other pressure chamber of the dual-circuit master cylinder and each is connected on its own via a supply valve with the auxiliary-pressure source.

Preferably, the wheel brakes of the rear wheels are connected jointly via a supply line to the auxiliary-pressure source, with a supply valve being inserted into the supply line. The wheel brake of the one front wheel is connected through a first brake line to one pressure chamber of the master cylinder and the wheel brake of the other rear wheel is connected via a second brake line to the other pressure chamber of the master cylinder. Finally, the wheel brakes of the two front wheels is connected in each case via supply valves to the supply line. Advantageously, each non-return valve can be inserted into the brake lines interconnecting the wheel brakes and the pressure chambers of the master cylinder, the said valve permitting a return flow of the pressure fluid out of a brake line into the connected pressure chamber, however, prevents the escape of pressure fluid out of a pressure chamber into the brake lines.

BRIEF DESCRIPTION OF THE DRAWING

Further features, advantages and possibilities of the instant invention can be realized from the following description of two embodiments taken with reference to the accompanying drawings in which:

FIG. 2 is similar to FIG. 1, but illustrates a second slip controlled brake system according to this invention.

DETAILED DESCRIPTION OF A PREFERRED EMBODIMENT

Figure 1:
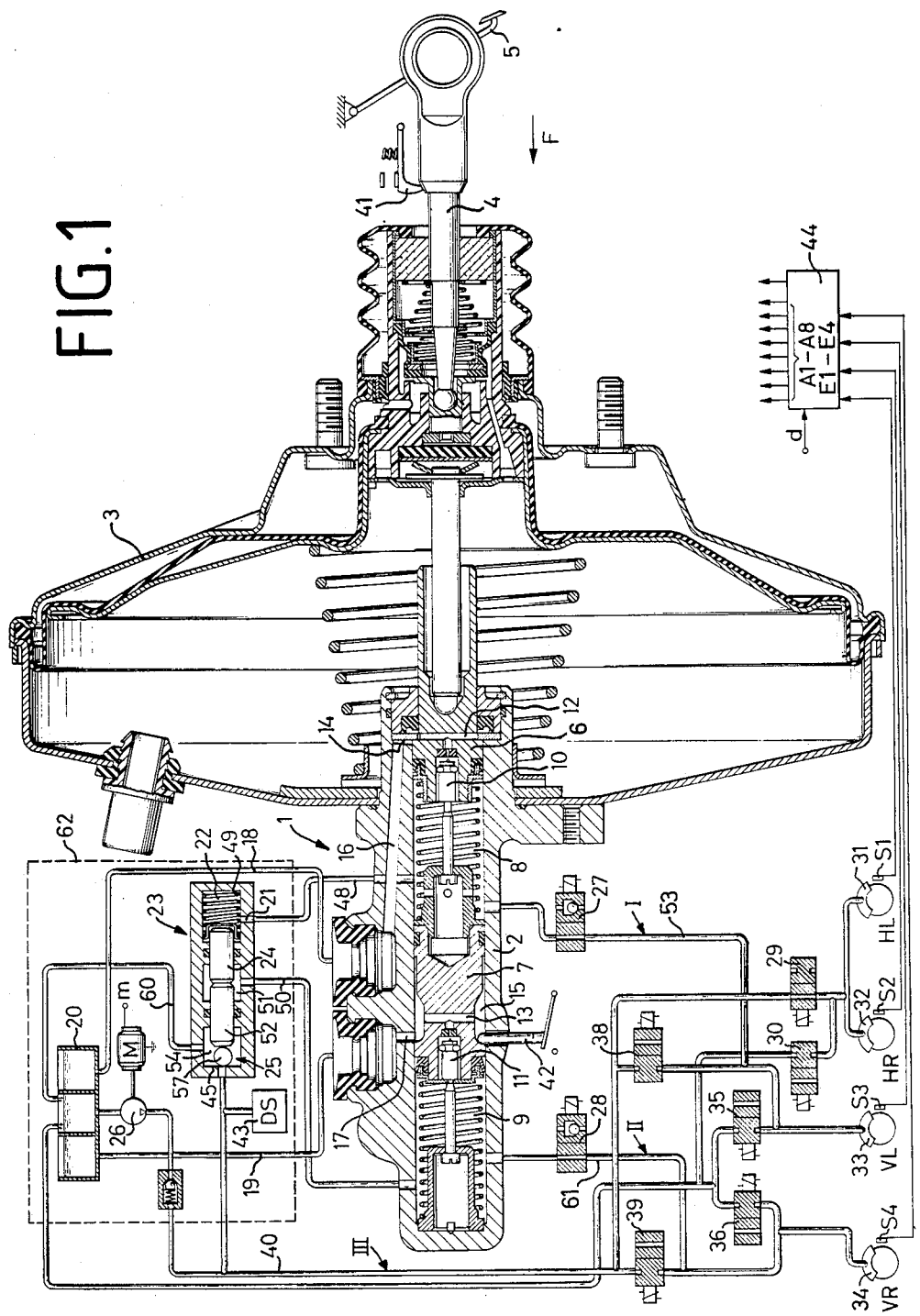
FIG. 1 is a schematic illustration with parts enlarged and in section of a first slip controlled brake system according to this invention.

In the embodiment according to FIG. 1, a brake system in accordance with this invention comprises a braking pressure generator 1 including a hydraulic unit which is substantially composed of a tandem master cylinder 2 and a vacuum booster 3 connected in front thereof. In a known manner, the pedal force F is applied on a brake pedal 5 and is transmitted via a push rod 4 onto the vacuum booster 3 and, boosted by auxiliary force, onto the working pistons 6 and 7 of the tandem master cylinder.

In the brake's release position shown, in the drawing, the pressure chambers 8, 9 of the master cylinder are in communication with a pressure-compensating and pressure-fluid supply reservoir 20. This communication is via open central valves 10, 11 and connecting channels 12, 13 located in the interior of the pistons 6 and 7. These channels 12, 13 communicate via annular chambers 14, 15, connecting bores 16, 17 and hydraulic lines 18, 19 which lines communicate with the reservoir 20.

Connected to one of the two pressure chambers, herein to the pressure chamber 8, is the control input 21 which communicates with the first control chamber 22 of a regulating valve 23 with pressure-monitoring function of an auxiliary-pressure source 62. The pistons 24, 52 are located in the interior of the regulating valve 23 and transmit the control pressure onto a spherical seat valve 25 which, on the one hand, is connected hydraulically to the pressure side of a hydraulic pump 26 and, on the other hand, is connected to the pressure-compensating reservoir 20. The suction side of the pump 26 is likewise in connection with the reservoir 20. The pump 26 is an electromotively (motor M) driven hydraulic pump 26. The electrical connections 'm' and 'Masse' (ground) are likewise illustrated schematically.

The two brake circuits I, II of the master cylinder 2 are connected with the wheel brakes 33, 34 via electromagnetically actuatable valves 27, 28 which are open in their unpressurized state. For instance, the wheel brakes 33, can be associated with the wheels of the front axle.

The wheel brakes 31 to 34 are connected to electromagnetically actuatable outlet valves 30, 35, 36 which are closed in their active position and which are in communication with the pressure-compensating reservoir 20 via a hydraulic return line 37.

The brake circuits I, II are each via a shut-off valve 38, 39 and via a supply line 40 connected to the auxiliary-pressure supply system 62, namely to the hydraulic pump 26 and the regulating valve 23. The shut-off valves 38, 39 will open when the controlled braking action (braking with anti-skid control) commences. The change-over of the valves 28, 29 into a second switch position is caused by an electric signal of the controller 44 or when the travel-responsive switch 42 is actuated by the ramp of the piston 7.

The vehicle wheels are equipped with inductive sensors $S_1$ and $S_4$ which cooperate with a toothed disk co-rotating synchronously to the wheel rotation and which generate electric signals indicative of the wheel rotational behavior, that is the wheel speed and variations thereof. These signals are fed via the inputs $E_1$ and $E_4$ to an electronic signal-processing and combining circuitry 44 which generates braking-pressure control signals serving to temporarily switch over the inlet and outlet valves 30, 35, 36 and, respectively, 29, 38, 39 on detection of an imminent locked condition and to thereby keep the braking pressure constant, to decrease it and to re-increase it at the appropriate time. To this end, the actuating magnets of the inlet and outlet valves are driven via the outputs $A_1$ to $A_4$. The electric connecting lines between the connections $A_1$ to $A_8$ and the coils of the valves 29, 30, 35, 36, 38, 39 and, respectively, 27, 28 are not illustrated for the sake of simplicity.

The circuitry can be realized in a known fashion by hard-wired circuits or by programmed electronic units, such as microcomputers or microcontrollers.

When generating the braking-pressure control signals, additionally, the switching condition of a differential-pressure switch 43, which is associated with the regulating valve 23, and, if present, still other signals are evaluated. The signal input d is provided for this purpose. The switch-on signal for the start-up of the drive motor of the hydraulic pump 26, which runs during the braking action, is applied to the motor M via the connection m after actuation of the switch 41 by the pushrod 4.

The brake system operates as follows:

On brake application, the pedal force F, boosted by the vacuum in the booster 3, is transmitted onto the master-cylinder pistons 6, 7. The central valves 10, 11 close so that now braking pressure is allowed to develop in the pressure chambers 8, 9 and thus in the brake circuits I, II which propagates via the valves 27, 28 to the wheel brakes 31, 32 and 33, 34, respectively.

The pressure in the chamber 8 is supplied further to the control input 21 and the control chamber 22 of the control valve 23 and increases the closing force of the seat valve 25 which is produced by the controller spring 49. Likewise, there is communication via the pressure line 50 between the brake circuit II or the pressure chamber 9, respectively, and the second control chamber 51, into which the two pistons 24, 52 are immersed, the drive motor M of the pump 26 starting its operation.

On detection of an imminent locked condition at one or more of the wheels by means of the sensors $S_1$ to $S_4$ and the circuitry 44, slip control will commence. In the auxiliary-pressure supply system and in the supply line 40, the pump 26 will develop an auxiliary pressure proportional to the pressure in the control chambers 22, 51 and in the pressure chambers 8, 9, respectively, and thus to the pedal force F.

When auxiliary pressure exists, now the electromagnetically drivable valves 29, 38, 39 are switched to assume their open-passage position, while pressure fluid is dynamically introduced into the brake circuits I, II. The actual braking pressure variation in the wheel brakes 31 to 34 is determined by the outlet valves 30, 35, 36 which, via the signal lines, are supplied with slip-controlling braking pressure control signals by the circuitry 44.

Defects of various type can be detected reliably when comparing the pressure in the pressure chambers 8 and 9 of the master cylinder 2 and, respectively, in the lines 48, 50 leading to the auxiliary pressure regulating valve 23 with the instantaneous auxiliary pressure caused by the pump 26 and the regulating valve 23, while taking into consideration the condition of operation, that means is it a normal braking action or a response of the slip control. In the case of a braking action without slip control, pressure must build up in the pressure chambers 8, 9 but not in the auxiliary-pressure supply system. Failure of the brake circuit II, e.g. due to leakage, can be detected by means of the pressure switch 42 or the travel-responsive switch 43, respectively. With the system intact, the pressure difference becomes little or zero when slip control commences. In the event of failure or malfunction of the pump 26, of the regulating valve 23, upon the occurrence of a defect in the switch-on conduit of the motor M or the like, after the commencement of slip control, a pressure will be maintained in the pressure chamber 9 that is in excess of that in the auxiliary-pressure supply line 40. Hence follows that defects can be detected and signalled by logically combining this condition and others by means of the circuitry 44. Depending on the type of error, the circuitry 44 will then automatically disconnect the slip control completely or partially, that means limited to some wheel brakes, in order to still render possible effective braking through the intact brake circuit.

The regulating valve 23 comprises entirely three chambers 22, 52, 54 located coaxially to one another and isolated from one another by two pistons 24, 52. These pistons 24, 52 act upon a valve ball 57 which serves to close the port at the valve seat 45. If the hydraulic pressure generated by the pump 26 is higher than the pressure prevailing in the control chambers 22 and/or 51, then the pistons 24, 52 will displace to the right, thereby allowing the valve ball 57 to lift from the valve seat 45 so that part of the pressure fluid delivered by the pump 26 can return via the return line 60 into the reservoir 20 for the pressure relief.

The embodiment according to FIG. 2 differs from that according to FIG. 1 in that there is provision of three control channels and two brake circuits and not (as in the embodiment according to FIG. 1) three control channels and three brake circuits. For this purpose, the pressure chamber 8 is connected with the wheel brakes of the two rear wheels 31, 32 via the brake line 59, and the pressure chamber 9 communicates via the brake lines 58, 55, 56 with the wheel brakes of the front wheels. In the embodiment of FIG. 2, the pump 26 does not start to function on each brake application, but only if the circuitry 44 detects the tendency of a vehicle wheel to lock by means of the sensors $S_1$ to $S_4$. In this instance, further pressure development in the wheel brakes 31 to 34 takes place via the supply line 40, 40' and the two-way/two-position directional control valves, that is inlet valves 29, 38, 39.

What is claimed is:

1. A brake system with slip control for an automotive vehicle having front and rear vehicle wheels with wheel brakes, said system comprising, in combination:
   a pedal-actuating vacuum booster (3);
   a dual-circuit master cylinder (2) operatively connected to said booster (3) and said master cylinder (2) having first and second working chambers (8, 9) therein;
   an auxiliary-pressure source (62) having a pump (26) whose input is connected to a pressure-fluid supply reservoir (20);
   a plurality of wheel sensors (S1–S4) coupled to said wheels for generating electric signals indicative of wheel rotational behavior;
   an electronic circuit (44) respective of said electric signals for providing braking-pressure control signals;
   pressure fluid lines respectively coupled between said auxiliary-pressure source (62), said reservoir (20), said first and second chambers (8, 9) and said wheel brakes;
   first, second and third normally closed outlet valves (30, 35, 36) respectively connected in the pressure fluid lines between said reservoir (20) and a first one of said front wheels, a second one of said front wheels and a joint connection of said rear wheels;
   first and second normally open inlet valves (27, 28) respectively connected in the pressure fluid lines between said first and second chambers (8, 9) and selected ones of said wheel brakes;
   a third normally open inlet valve (29) connected between said auxiliary-pressure source (62) and said joint connection of said rear wheels;
   first and second normally closed inlet valves (38, 39) respectively connected between said auxiliary-pressure source (62) and said first and second ones of said front wheels; and,
   wherein said first and second normally closed inlet valves (38, 39) open during anti-skid control.

2. The brake system according to claim 1, wherein said first and second normally open inlet valves are switchable to a non-return valve position which allows fluid flow from said wheel brakes into said first and second chambers (8, 9).

3. The brake system according to claim 1, wherein said first and second normally open inlet valves (27, 28) are respectively connected between said first and second chambers (8, 9) and said first and second ones of said front wheels.

4. The brake system according to claim 3, wherein said rear brakes are solely responsive to dynamic fluid pressure generated in said auxiliary-pressure source (62).

5. The brake system according to claim 1 including a regulating valve (23) connected between said pump and said reservoir (20) and being responsive to braking pressure developed within said first and second chambers to relieve auxiliary-pressure source pressure when the pressure generated by said pump (26) exceeds the pressure within said chambers.

* * * * *